(No Model.) 2 Sheets—Sheet 1.

L. CHEVALLIER.
PHOTOGRAPHIC CAMERA.

No. 398,231. Patented Feb. 19, 1889.

WITNESSES:
Eduard Wolff.
William J. Miller

INVENTOR
Louis Chevallier.
BY Van Santvoord & Hauff
ATTORNEYS

N. PETERS, Photo-Lithographer, Washington, D. C.

(No Model.) 2 Sheets—Sheet 2.

L. CHEVALLIER.
PHOTOGRAPHIC CAMERA.

No. 398,231. Patented Feb. 19, 1889.

WITNESSES:
Eduard Wolff
William Miller

INVENTOR
Louis Chevallier.
BY
Van Santvoord & Hauff
ATTORNEYS

UNITED STATES PATENT OFFICE.

LOUIS CHEVALLIER, OF BROOKLYN, NEW YORK.

PHOTOGRAPHIC CAMERA.

SPECIFICATION forming part of Letters Patent No. 398,231, dated February 19, 1889.

Application filed August 9, 1888. Serial No. 282,304. (No model.)

*To all whom it may concern:*

Be it known that I, LOUIS CHEVALLIER, a citizen of the United States, residing at Brooklyn, in the county of Kings and State of New York, have invented new and useful Improvements in Photographic Cameras, of which the following is a specification.

This invention relates to an improvement applicable to photographic cameras, as set forth in the following specification and claims, and illustrated in the accompanying drawings, in which—

Figure 1:
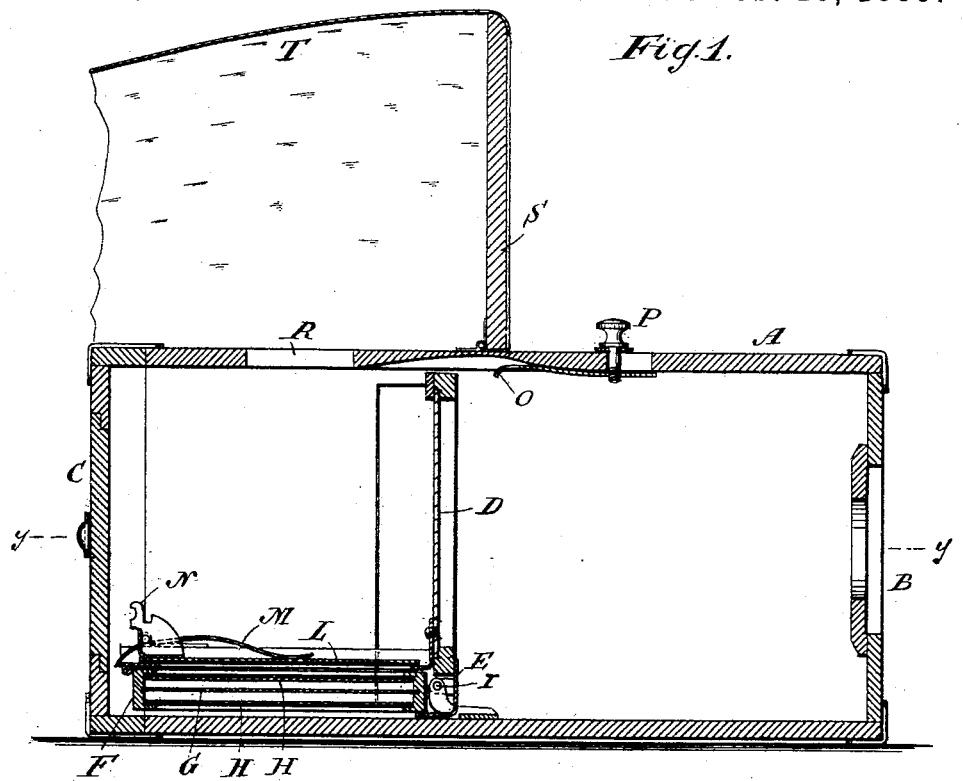
Figure 2:
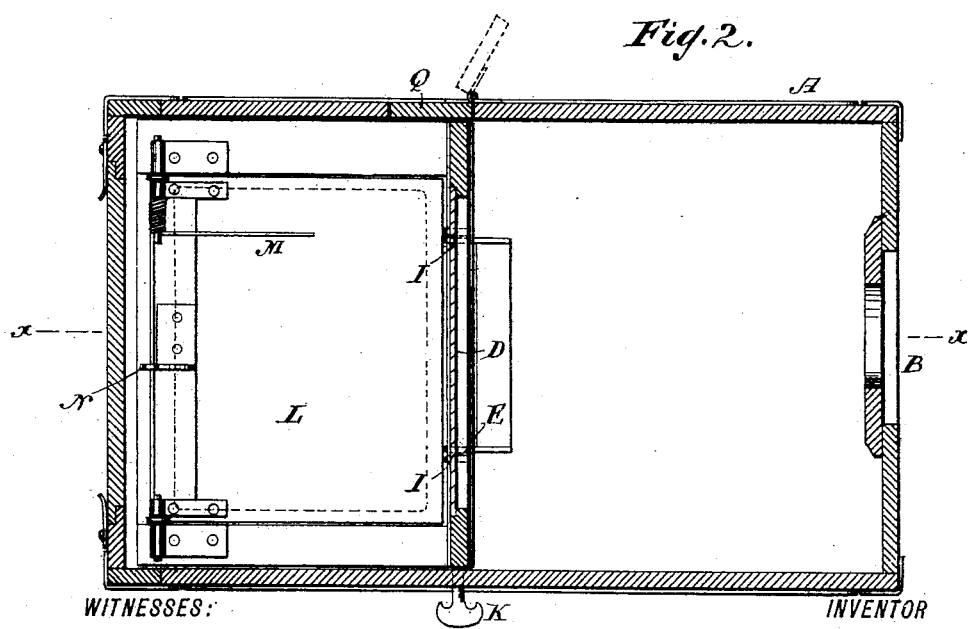
Figure 3:
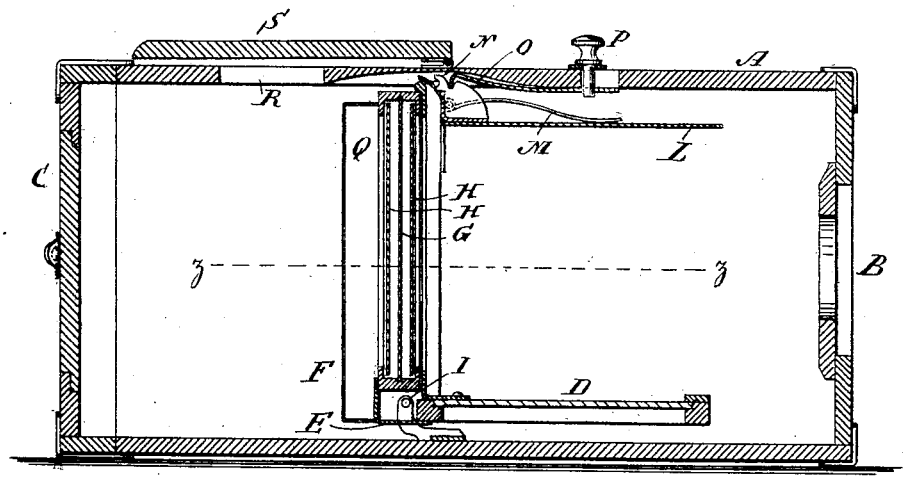
Figure 4:
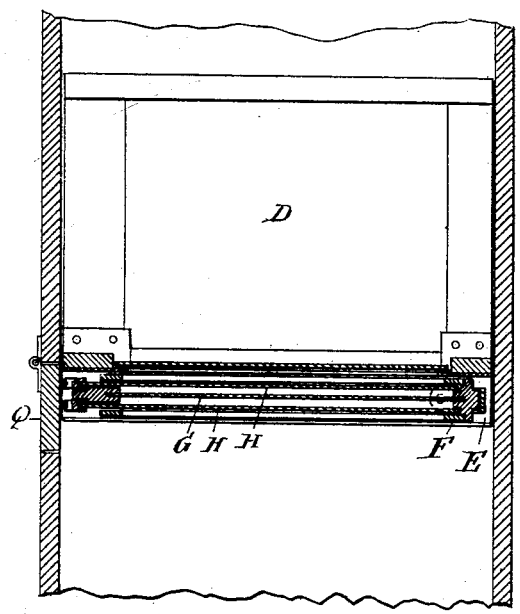

Figure 1 is a section of a camera along the line $x\, x$, Fig. 2. Fig. 2 is a section along the line $y\, y$, Fig. 1. Fig. 3 is a view similar to Fig. 1, with parts in a different position from that shown in Fig. 1. Fig. 4 is a section along the line $z\, z$, Fig. 3.

Similar letters indicate corresponding parts.

In the drawings, the letter A indicates the camera-walls. An opening, B, is intended for the adjustment or securing of a lens in the usual way, so that the lens will properly produce an image in the camera. The rear of the camera can be closed by a suitable cover, C. The sight-plate D, which is usually of ground glass, enables the operator to secure the proper adjustment for securing a sharply-defined image in the field occupied by the sight-plate in Fig. 1. The sight-plate is movably mounted in the camera.

In the drawings is shown a hinged rotating support or frame, E, carrying the rigidly-attached sight-plate, and said support enables the sight-plate to be brought to the positions shown in Figs. 1 and 3 as desired.

The holder or box F for the sensitized plate or sheet is rigid on the hinged rotating frame E in a position, as here shown, at right angles to the rigidly-attached sight-plate D, so that the sensitized-plate holder F and the sight-plate D move in unison—that is to say, when the hinged frame E is rotated to bring the sensitized-plate holder F into the field, the sight-plate D moves out of the field. This result is effected by arranging the holder F and the plate D rigid on the hinged or rotating frame E, so that, in fact, the sight-plate is swung downward out of the field of the lens by the swinging movement of the sensitized-plate holder F upward into the field and conversely. In these respects my invention differs substantially from sensitized-plate holders and a focusing-glass flexibly connected by canvas to a rotary axle.

It will of course be understood that the sensitized-plate holder F can be removed from the frame E, and by the terms rigid on said frame as regards the holder I mean that when the holder is in place it is, as it were, a fixed part of the frame E, in that it moves in unison with said frame.

The plate-holder F and the sight-plate D are at right angles to each other, or substantially so, and, being rigid on the rotating frame, it follows that when the plate-holder is vertical the sight-plate will be horizontal, or substantially so. It will be obvious, however, that it is not essential that the plate-holder and sight-plate be fixed exactly at right angles to each other.

The box F is shown with a back, G, and with two slides, H H. A sensitized sheet or plate can be placed on each side of the back G and covered by the slides H, and by then withdrawing the slide H which is nearer to the opening B, Fig. 3, one of the sensitized plates can be exposed. By then reversing the box F, so as to bring the other slide H nearer to the opening B, and removing such other slide, the other sensitized plate can be exposed. The box F is readily removable from the support E.

In the drawings, the rotating frame or support E is shown hinged on a fixed bearing, I, in the camera by a horizontal pivot-pin. By having a suitable handle, K, outside of the camera the support E can be actuated without opening the camera.

The sight-plate D and the sensitized plate to be exposed are so mounted in the camera that when the sight-plate and sensitized plate are moved from the position shown in Fig. 1 to the position shown in Fig. 3 the sensitized plate will come to rest in the same field occupied in Fig. 1 by the sight-plate D. Any image which has thus been sharply defined on the sight-plate will be sharply defined on the sensitized plate when the sensitized plate is moved to the position occupied in Fig. 1 by the sight-plate.

To the support E is secured a movable cover, L, which, when the parts are in the position shown in Fig. 1, covers the sensitized plate. A spring, M, tends to keep the cover L closed. When the parts are moved to the position shown in Fig. 3, the lug N of the cover L comes into contact with a lug-catch, O, so that said cover is moved or pressed into its open position. A set-screw, P, moving in a slot in the camera, can be made to adjust the lug O, so that when the parts are moved to the position shown in Fig. 3 the cover L will be automatically opened. If desired, the set-screw P can be moved forward, or toward the opening B, in which case the cover L will remain closed when the parts are in the position shown in Fig. 3, and will not be opened until said set-screw, with the lug O, is moved toward the rear of the camera. Generally, however, it may be more convenient to have the lug O adjusted as seen in Fig. 3, so that when the sensitized plate is moved into the field for photographing the cover L will automatically expose the sensitized plate.

A door, Q, at the side of the camera enables the slide H to be withdrawn at the proper moment. A sight-opening, R, enables the operator to observe when the image on the sight-plate D is sharply defined. A shield or cover, S, enables the sight-opening to be closed, Fig. 3, and said shield, when in the position shown in Fig. 1, serves to shade the eyes of the operator, so that a clear sight of the plate D can be obtained through the opening R. By having the shield S provided with a hood, T, of suitable material—such as dark fabric—the eyes of the operator can be effectively shaded.

By placing the sight-opening R to the rear of the sight-plate D, as seen in the drawings, the sighting of the plate D will not be interfered with by light entering through the opening B, as might be the case if the sight-opening R were placed in front of the sight-plate D.

A convenient way of operating the device is as follows: The parts being in the position shown in Fig. 1, with the box F placed on the movable support E, the cover C is closed. When the sight-plate D and the camera-lens are in the proper relative position, which will be indicated by the image being seen through the sight-opening R sharply defined on the sight-plate D, the shield S is closed, Fig. 3. The handle K is then actuated to move the box F into position to enable a slide H to be withdrawn through the door Q, which is opened for this purpose. During the withdrawal of this slide the box F has not been moved so far forward as to cause the cover L to be opened. When the slide H has been withdrawn and the door Q closed, then at the moment the operation of photographing is to commence the box F is brought so far forward as to cause the cover L to open, Fig. 3, thus bringing the sensitized plate into the field occupied in Fig. 1 by the sight-plate D. The sensitized plate is then exposed, and after having been exposed a sufficient period the box F is moved toward the rear of the camera, when the cover L closes over the sensitized plate. The removal of the box F from the camera is readily effected by opening the cover C, and the subsequent treatment of the sensitized plate or sheet can be conducted in any well-known suitable way.

By having the sight-plate and sensitized plate movably mounted in the camera, so that said plates can be actuated without being withdrawn from the camera and without its being necessary to open the camera, the process of photographing can be rapidly and conveniently accomplished.

What I claim as new, and desire to secure by Letters Patent, is—

1. The combination, with the case of a photographic camera, of a rotating frame, E, located therein and provided with a handle outside the case for rotating the frame from the exterior, and a plate-holder, F, and a sight-plate, D, both rigid on the rotating frame and arranged substantially at right angles to each other, so that by rotating the frame in one direction the sight-plate swings into the field to focus the object and the plate-holder swings out of the field, and by rotating the frame in the opposite direction the sight-plate swings out of the field and the plate-holder into the field, substantially as described.

2. The combination, with the case of a photographic camera, of a swinging sensitized-plate holder, F, having a cover, L, hinged thereto and provided with a spring which normally holds the cover closed over a plate, and a lug or catch in the camera-case which acts on the cover and automatically opens it when the plate-holder is swung into the field, substantially as described.

3. The combination, with the case of a photographic camera, of a pivoted swinging sensitized-plate holder having a cover normally held closed over the plate, and a device inside the camera-frame which acts on the cover and automatically opens it when the holder is swung in the arc of a circle into the field, substantially as described.

4. The combination, with a camera-case, of the pivoted swinging sensitized-plate holder F, the cover L, hinged to said holder and having the projecting lug N, the spring M, acting to press the cover closed on the holder, and the catch O on the camera-case, arranged to strike the lug of the cover and open the latter when the holder is swung into the field, substantially as described.

5. A camera having a swinging sight-plate, D, a sight-opening, R, in its top wall between its rear end and the sight-plate, a hinged shield, S, adapted to stand upright, and the hood T, secured to the shield over the sight-opening, substantially as shown and described.

In testimony whereof I have hereunto set my hand and seal in the presence of two subscribing witnesses.

LOUIS CHEVALLIER. [L. S.]

Witnesses:
   W. C. HAUFF,
   E. F. KASTENHUBER.